United States Patent
Malloy et al.

(10) Patent No.: US 9,583,221 B2
(45) Date of Patent: Feb. 28, 2017

(54) INTEGRATED EMERGENCY CORE COOLING SYSTEM CONDENSER FOR PRESSURIZED WATER REACTOR

(75) Inventors: John D. Malloy, Goode, VA (US);
Mathew W. Ales, Issaquah, WA (US);
Ronald C. Watson, Forest, VA (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 889 days.

(21) Appl. No.: 13/161,078

(22) Filed: Jun. 15, 2011

(65) Prior Publication Data
US 2012/0321030 A1    Dec. 20, 2012

(51) Int. Cl.
| | |
|---|---|
| G21C 15/00 | (2006.01) |
| G21C 1/32 | (2006.01) |
| G21C 13/02 | (2006.01) |
| G21C 15/18 | (2006.01) |
| G21C 1/08 | (2006.01) |
| G21C 1/09 | (2006.01) |

(52) U.S. Cl.
CPC .............. *G21C 1/32* (2013.01); *G21C 13/02* (2013.01); *G21C 15/18* (2013.01); *G21C 1/086* (2013.01); *G21C 1/09* (2013.01); *Y02E 30/32* (2013.01)

(58) Field of Classification Search
CPC ............ G21C 1/32; G21C 1/322; G21C 1/326
See application file for complete search history.

(56) References Cited

U.S. PATENT DOCUMENTS 3,245,881 A * 4/1966 Ammon ............... G03G 15/102
376/299
3,841,202 A 10/1974 Groves
(Continued)

FOREIGN PATENT DOCUMENTS

EP        2096644      9/2009
WO    2007083192    7/2007

OTHER PUBLICATIONS

Ruben Mazzi, "CAREM: An innovative-integrated PWR," 18th Inernational Conference on Structural Mechanics in Reactor Technology, Aug. 2005.*

(Continued)

*Primary Examiner* — Marshall O'Connor
(74) *Attorney, Agent, or Firm* — Nelson Mullins Riley & Scarborough, LLP (57) ABSTRACT

A pressurized water nuclear reactor (PWR) includes a pressure vessel having a lower portion containing a nuclear reactor core comprising a fissile material and an upper portion defining an internal pressurizer volume. A condenser is secured to, and optionally supported by, the upper portion of the pressure vessel. A condenser inlet is in fluid communication with the internal pressurizer volume. A heat sink is in fluid communication with the condenser such that the condenser operates as a passive heat exchanger to condense steam from the internal pressurizer volume into condensate while rejecting heat to the heat sink. A condenser outlet connects with the pressure vessel to return condensate to the pressure vessel. A single metal forging having a first end welded to the pressure vessel and a second end welded to the condenser inlet may provide the fluid communication between the condenser inlet and the internal pressurizer volume.

12 Claims, 3 Drawing Sheets

(56) References Cited

U.S. PATENT DOCUMENTS

| | | | |
|---|---|---|---|
| 3,934,457 A * | 1/1976 | Clark | G01N 29/265 |
| | | | 376/249 |
| 4,473,528 A | 9/1984 | Kleimola | |
| 4,576,782 A | 3/1986 | Loose | |
| 4,753,771 A | 6/1988 | Conway et al. | |
| 4,897,240 A * | 1/1990 | Sako | G21C 1/322 |
| | | | 376/264 |
| 4,986,956 A | 1/1991 | Garabedian | |
| 5,000,907 A | 3/1991 | Chevereau et al. | |
| 5,011,652 A | 4/1991 | Tominaga et al. | |
| 5,028,383 A | 7/1991 | Moore | |
| 5,045,274 A | 9/1991 | Donaldson | |
| 5,049,353 A | 9/1991 | Conway et al. | |
| 5,075,070 A | 12/1991 | Costes | |
| 5,087,408 A | 2/1992 | Tominaga et al. | |
| 5,102,616 A | 4/1992 | Gardner et al. | |
| 5,106,571 A | 4/1992 | Wade et al. | |
| 5,202,083 A | 4/1993 | Spinks et al. | |
| 5,268,943 A | 12/1993 | Corletti et al. | |
| 5,276,720 A | 1/1994 | Oosterkamp et al. | |
| 5,282,230 A | 1/1994 | Billig et al. | |
| 5,301,216 A | 4/1994 | Klapdor et al. | |
| 5,309,489 A | 5/1994 | Tate et al. | |
| 5,349,617 A | 9/1994 | Gautier | |
| 5,398,719 A | 3/1995 | Drossel et al. | |
| 5,517,538 A | 5/1996 | Seidelberger et al. | |
| 5,661,770 A | 8/1997 | Spinks | |
| 5,694,442 A | 12/1997 | Cinotti et al. | |
| 5,887,043 A | 3/1999 | Spinks | |
| 6,795,518 B1 | 9/2004 | Conway et al. | |
| 7,154,982 B2 | 12/2006 | Gautier et al. | |
| 7,680,237 B1 | 3/2010 | Meseth | |
| 8,170,173 B2 | 5/2012 | Reyes, Jr. et al. | |
| 2009/0129530 A1 | 5/2009 | Reyes, Jr. et al. | |
| 2009/0129531 A1 | 5/2009 | Reyes, Jr. et al. | |
| 2010/0278294 A1 | 11/2010 | Kwon et al. | |
| 2011/0064180 A1 | 3/2011 | Akatsuka et al. | |
| 2011/0222640 A1 | 9/2011 | Desantis | |
| 2012/0177168 A1 | 7/2012 | Reyes, Jr. et al. | |
| 2012/0207260 A1 | 8/2012 | Houghton et al. | |
| 2012/0294408 A1 | 11/2012 | Reyes, Jr. et al. | |
| 2013/0336440 A1 | 12/2013 | Memmott et al. | |
| 2013/0336441 A1 | 12/2013 | Cronje et al. | |
| 2014/0016734 A1 | 1/2014 | Moon et al. | |
| 2014/0050292 A1 | 2/2014 | Kim et al. | |

OTHER PUBLICATIONS

Brogan, R.J., Shell and Tube Heat Exchangers, www.thermopedia.com/content/1121.*

Kostin (V.I. Kostin et al., VBER-300 Reactor System and Power-Generating Units for Regional Nuclear Power Production, Atomic Energy, vol. 102, No. 1 (2007).*

Mazzi (Mazzi, Ruben, CAREM: An Innovative-Integrated PWR, 18th International Conferences on Structural Mechanics in Reactor Technology, Aug. 2005, pp. 4407-4415).*

Brogan, R.J., Shell and Tube Heat Exchangers, www.thermopedia.com/contentJ1121.*

Unknown Author, Status report 66—VBER-300 (VBER-300). Available Online at: http://www.iaea.org/NuclearPower/Downloadable/aris12013/30.VBER-300.pdf. Last accessed by applicant on Feb. 9, 2015. See Figure 1 on p. 2.

International Search Report and Written Opinion for PCT/US2013/024818 dated Apr. 15, 2013.

* cited by examiner

INTEGRATED EMERGENCY CORE COOLING SYSTEM CONDENSER FOR PRESSURIZED WATER REACTOR

BACKGROUND

The following relates to the nuclear reactor arts, electrical power generation arts, nuclear safety arts, and related arts.

Nuclear reactors employ a reactor core comprising a mass of fissile material, such as a material containing uranium oxide ($UO_2$) that is enriched in the fissile $^{235}U$ isotope. Primary coolant water, such as light water ($H_2O$) or heavy water ($D_2O$) or some mixture thereof, flows through the reactor core to extract heat for use in heating secondary coolant water to generate steam or for some other useful purpose. For electrical power generation, the steam is used to drive a generator turbine. In thermal nuclear reactors, the primary coolant water also serves as a neutron moderator that thermalizes neutrons, which enhances reactivity of the fissile material. Various reactivity control mechanisms, such as mechanically operated control rods, chemical treatment of the primary coolant with a soluble neutron poison, or so forth are employed to regulate the reactivity and resultant heat generation. In a pressurized water reactor (PWR), the primary coolant water is maintained in a subcooled state in a sealed pressure vessel that also contains the reactor core. In the PWR, both pressure and temperature of the primary coolant water are controlled.

To extract power from the PWR or other nuclear reactor, secondary coolant water is flowed in thermal communication with the primary coolant water. A steam generator device is suitably used for this thermal exchange. In the steam generator, heat (i.e., energy) is transferred from the reactor core to the secondary coolant water via the intermediary of the primary coolant water. This heat converts the secondary coolant water from liquid water to steam. The steam is typically flowed into a turbine or other power conversion apparatus that makes practical use of the steam power. Viewed another way, the steam generator also serves as a heat sink for the primary coolant.

The steam generator may, in general, be located external to the pressure vessel, or internal to the pressure vessel. A PWR with an internal steam generator is sometimes referred to as an integral PWR, an illustrative example of which is shown in Thome et al., "Integral Helical Coil Pressurized Water Nuclear Reactor", U.S. Pub. No. 2010/0316181 A1 published Dec. 16, 2010 which is incorporated herein by reference in its entirety. This publication discloses a steam generator employing helical steam generator tubing; however, other coil geometries including straight (e.g., vertical) steam generator tubes are also known. This publication also discloses an integral PWR in which the control rod drive mechanism (CRDM) is also internal to the pressure vessel; however, external CRDM designs are also known. Some illustrative examples of internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety.

During normal PWR operation, the primary coolant is subcooled and is at both elevated temperature and elevated pressure. For example, one contemplated integral PWR is designed to operate with the primary coolant at a temperature of greater than 300° C. and a pressure of about 2000 psia. These elevated conditions are maintained by heat emitted by the radioactive nuclear reactor core. In various abnormal event scenarios, this radioactivity can increase rapidly, potentially leading in turn to rapid and uncontrolled increase in primary coolant pressure and temperature. For example, in a "loss of heat sink event" the secondary coolant flow in the steam generator fails, leading to loss of heat sinking provided by the secondary coolant. In a SCRAM failure, the control rod system is compromised such that the control rods may be unable to "SCRAM", that is, be released to fall into the reactor core, to provide rapid shutdown. While a SCRAM failure may not cause immediate core heating, the loss of this safety system typically calls for immediate shutdown of the reactor. In a loss of coolant accident (LOCA), a rupture in the pressure vessel or a pipe connecting with the pressure vessel allows some of the primary coolant to be released under pressure from the pressure vessel. The released primary coolant generally expands as steam outside of the pressure vessel. A LOCA introduces numerous potential safety issues such as a possible release of radioactivity, emission of hot steam, and so forth. Furthermore, a LOCA can constitute a positive feedback condition as the lost primary coolant causes the reactor core to heat up uncontrollably leading to increased pressure that drives further loss of primary coolant.

In view of such concerns, a PWR typically has an external containment structure to contain any release of primary coolant in a LOCA. The PWR also typically has an associated emergency core cooling system (ECCS) that is designed to respond to an abnormal condition by bringing about rapid cooling of the reactor core, suppressing any concomitant pressure increase, and recapturing any released primary coolant steam. One component of the ECCS is typically a condenser (or a redundant set of condensers) that are connected with the pressure vessel to condense steam in the event of a LOCA or loss of heat sinking event.

Disclosed herein are improvements that provide various benefits that will become apparent to the skilled artisan upon reading the following.

BRIEF SUMMARY

In one aspect of the disclosure, an apparatus comprises: a pressurized water reactor (PWR) including a pressure vessel having a lower portion containing a nuclear reactor core comprising a fissile material and an upper portion defining an internal pressurizer volume; a condenser supported by the upper portion of the pressure vessel; and a steam line connecting the internal pressurizer volume with a condenser inlet of the condenser.

In another aspect of the disclosure, an apparatus comprises: a PWR including a pressure vessel having a lower portion containing a nuclear reactor core comprising a fissile material and an upper portion defining an internal pressurizer volume; a condenser; and a single metal forging providing fluid communication between the internal pressurizer volume with a condenser inlet of the condenser, the single metal forging having a first end welded to the pressure vessel and a second end welded to the condenser.

In another aspect of the disclosure, an apparatus comprises: a PWR including a pressure vessel having a lower portion containing a nuclear reactor core comprising a fissile material and an upper portion defining an internal pressurizer volume; a condenser secured to the upper portion of the pressure vessel and having a condenser inlet in fluid communication with the internal pressurizer volume; a heat sink in fluid communication with the condenser, the condenser operating as a passive heat exchanger to condense steam from the internal pressurizer volume into condensate while rejecting heat to the heat sink; and a condenser outlet connected with the pressure vessel to flow the condensate back into the pressure vessel.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
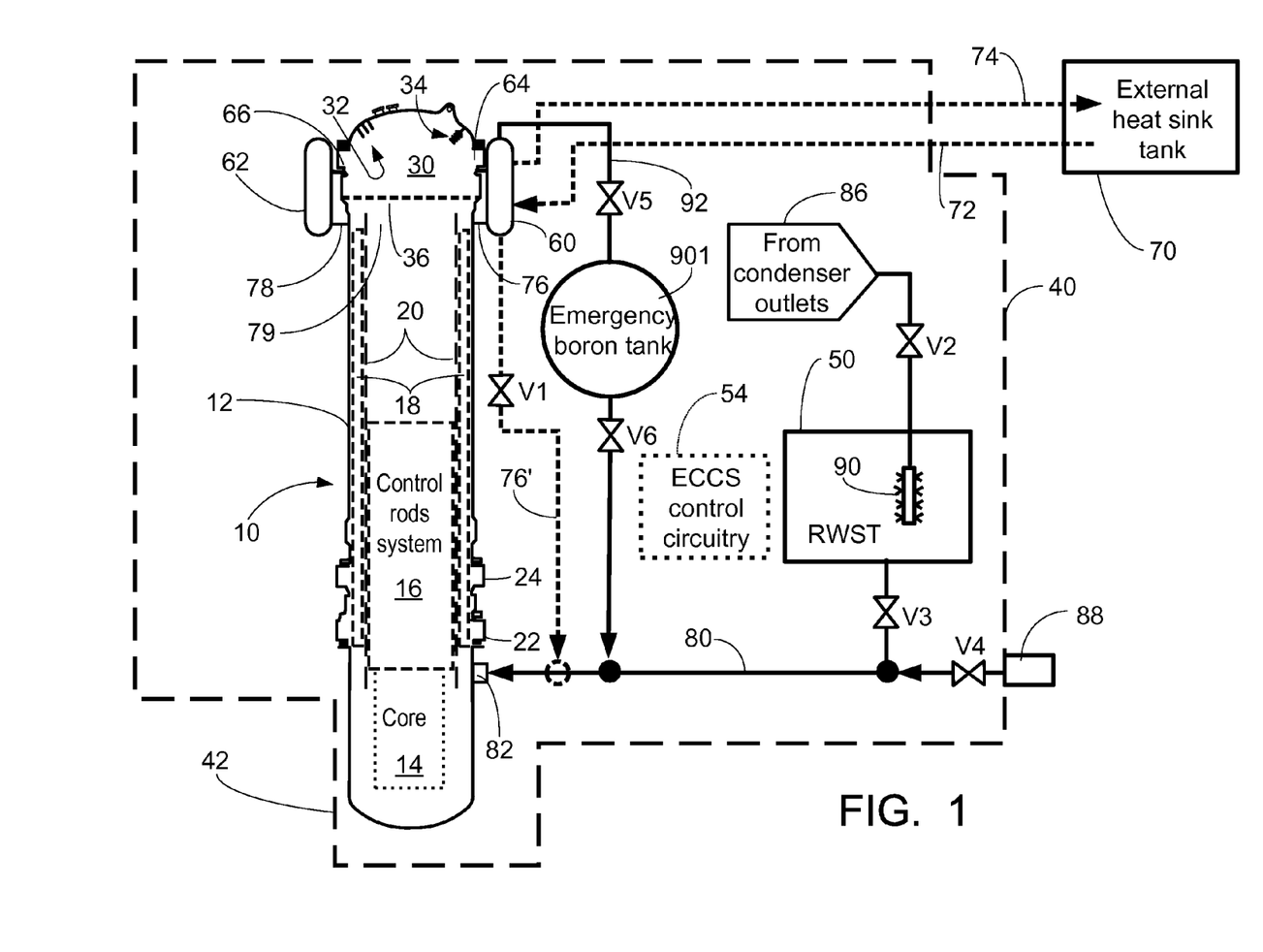
FIG. 1 diagrammatically shows an illustrative pressurized water reactor (PWR) together with its associated containment structure and a schematic diagram of its associated emergency core cooling system (ECCS).

With reference to FIG. 1, an illustrative nuclear reactor of the pressurized water reactor (PWR) type 10 includes a pressure vessel 12, which in the illustrative embodiment is a generally cylindrical vertically mounted vessel. Selected components of the PWR that are internal to the pressure vessel 12 are shown diagrammatically in phantom (that is, by dotted lines). A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket. The pressure vessel 12 contains primary coolant water (typically light water, that is, $H_2O$, although heavy water, that is, $D_2O$, is also contemplated) in a subcooled state.

A control rods system 16 is mounted above the reactor core 14 and includes control rod drive mechanism (CRDM) units and control rod guide structures configured to precisely and controllably insert or withdraw control rods into or out of the reactor core 14. The illustrative control rods system 16 employs internal CRDM units that are disposed inside the pressure vessel 12. Some illustrative examples of suitable internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO 2010/144563 A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible into the reactor core to shut down the nuclear reaction in the event of an emergency. Various hybrid control rod designs are also known. For example, a gray rod may include a mechanism for releasing the control rod in an emergency so that it falls into the reactor core 12 thus implementing a shutdown rod functionality.

The illustrative PWR 10 is an integral PWR, and includes an internal steam generator 18 disposed inside the pressure vessel 12. In the illustrative configuration, a cylindrical riser 20 is disposed coaxially inside the cylindrical pressure vessel 12. The riser 20 surrounds the control rods system 16 and extends upward, such that primary coolant water heated by the operating nuclear reactor core 14 rises upward through the cylindrical riser 20 toward the top of the pressure vessel, where it discharges, reverses flow direction and flows downward through an outer annulus defined between the cylindrical riser 20 and the cylindrical wall of the pressure vessel 12. This circulation may be natural circulation that is driven by reactor core heating and subsequent cooling of the primary coolant, or the circulation may be assisted or driven by primary coolant pumps (not shown). The illustrative steam generator 18 is an annular steam generator disposed in the outer annulus defined between the cylindrical riser 20 and the cylindrical wall of the pressure vessel 12. Vertically, the lower end of the illustrative steam generator 18 partially overlaps the control rod system 16, and the steam generator 18 extends upward to near the top of the cylindrical riser 20. The steam generator provides independent but proximate flow paths for downwardly flowing primary coolant and upwardly flowing secondary coolant. The secondary coolant enters at a feedwater inlet 22, flows upward through the steam generator 18 where it is heated by the proximate downwardly flowing primary coolant to be converted to steam, and the steam discharges at a steam outlet 24.

FIG. 1 does not illustrate the detailed structure of the steam generator. Typically, the steam generator comprises steam generator tubes and a surrounding volume (or "shell") containing the tubes, thus providing two proximate flow paths that are in fluid isolation from each other. In some embodiments, the primary coolant flows downward through the steam generator tubes (that is, "tube-side") while the secondary coolant flows upward through the surrounding volume (that is, "shell-side"). In other embodiments, the primary coolant flows downward through the surrounding volume (shell-side) while the secondary coolant flows upward through the steam generator tubes (tube-side). In either configuration, the steam generator tubes can have various geometries, such as vertical straight tubes (sometimes referred to as a straight-tube once-through steam generator or "OTSG"), helical tubes encircling the cylindrical riser (some embodiments of which are described, by way of illustrative example, in Thome et al., "Integral Helical Coil Pressurized Water Nuclear Reactor", U.S. Pub. No. 2010/0316181 A1 published Dec. 16, 2010 which is incorporated herein by reference in its entirety), or so forth.

It will be noticed in FIG. 1 that the illustrative PWR 10 has the steam outlet 24 located at a low position, that is, near the bottom of the steam generator 18. However, the secondary coolant is converted to steam as the secondary coolant flows upwardly through the steam generator 18, such that the hottest steam is expected to be present near the top of the steam generator 18. The placement of the steam outlet 24 located at its illustrated low position reflects the presence of an annular steam jacket (not shown) disposed between the steam generator 18 and the cylindrical wall of the pressure vessel 12. This steam jacketing approach is optional, but has the benefit of providing a higher temperature outer surface for maintaining temperature stability. In an alternative embodiment, the steam jacket is omitted and the steam outlet is located at or near the top of the steam generator 18.

The illustrative PWR 10 is an integral PWR including the steam generator 18 disposed inside the pressure vessel 12. In other embodiments, the PWR is not an integral PWR; rather the steam generator is located externally. In these embodiments, the feedwater inlet 22 and steam outlet 24 are suitably replaced by high pressure vessel penetrations flowing primary coolant water out of the pressure vessel, through the external steam generator, and back to the pressure vessel. Moreover, contemplated integral PWR designs may place the steam generator at various locations in the pressure vessel, such as partially surrounding the reactor core, or disposed inside the cylindrical riser, or so forth.

The pressure vessel 12 defines a sealed volume that, when the PWR is operational, contains primary coolant water in a subcooled state. Toward this end, the PWR includes an internal pressurizer volume 30 disposed at, and defined in part by, an upper portion of the pressure vessel 12. The internal pressurizer volume 30 contains a steam bubble volume whose pressure controls the pressure of the primary coolant water in the pressure vessel 12. At least one steam pressure control device is provided to adjust or control the pressure of the steam bubble in the internal pressurizer volume 30. By way of illustrative example, the steam pressure control device or devices may include a heater 32 (e.g., one or more resistive heaters) that heats the steam to increase pressure, and/or a sparger 34 that injects cool water or steam into the steam bubble to reduce pressure. A baffle plate 36 separates the internal pressurizer volume from the remainder of the sealed volume of the pressure vessel 10. By way of illustrative example, in some embodiments the primary coolant pressure in the sealed volume of the pressure vessel 12 is at a pressure of about 2000 psia and at a temperature of about 300° C. (cold leg just prior to flowing into the reactor core 14) to 320° C. (hot leg just after discharge from the reactor core 14). These are merely illustrative subcooled conditions, and a diverse range of other operating pressures and temperatures are also contemplated.

With continuing reference to FIG. 1, the PWR 10 is disposed in a containment structure 40, which may by way of illustrative example comprise a concrete, steel, steel-reinforced concrete, or other structure. The containment structure 40 is intended to contain any release of primary coolant water from the PWR 10 in the event of a loss of coolant accident (LOCA). In some embodiments the containment structure 40 may be partially or wholly subterranean. In the illustrative embodiment, at least a flood well 42 portion of the containment structure is buried, and the lower portion of the PWR 10 including the nuclear reactor core 14 resides in this flood well 42.

FIG. 1 also diagrammatically depicts an emergency core cooling system (ECCS) configured to remediate various abnormal operating conditions such as a LOCA, a loss of heat sinking event, or a SCRAM failure. The ECCS includes a water storage tank 50 disposed inside the containment 40. The water storage tank 50 is also sometimes referred to as a refueling water storage tank (since it may optionally be utilized as a source of make-up primary coolant water during refueling of the PWR 10) or as a reactor water storage tank. The water storage tank 50 is also referred to herein by the acronym "RWST" 50.

With continuing reference to FIG. 1, the ECCS also includes a valve assembly comprising valves and piping for selectively interconnecting the RWST 50 and various components of the ECCS with each other and/or with the PWR 10. It is to be appreciated that FIG. 1 shows a schematic diagram of the ECCS for the purpose of illustrating preferred embodiments, and it is to be understood that further additional or substitute features may also or alternatively be included based on considerations of the specific design implementation, applicable government regulations, or so forth.

In describing the illustrative ECCS embodiments, the following terminology is used herein. Terms such as "normally open" or "normally closed" refer to the normal condition or state of the valve or other element during normal operation of the PWR 10 for its intended purpose (for example, the intended purpose of generating electrical power in the case of a nuclear power plant). A term such as "abnormal operation signal" refers to a signal generated by a sensor or other device indicating that some metric or aspect of the PWR operation has deviated outside of the normal PWR operational space. By way of illustrative example, an abnormal operation signal may comprise a low reactor water level signal, or an abnormal operation signal may comprise a high reactor pressure signal. A low reactor water level signal may indicate a LOCA, while a high reactor pressure signal may indicate a loss of heat sinking event. Typically, an abnormal operation signal (or a combination of such signals) will automatically trigger an audible, visual, or other alarm to notify reactor operation personnel of the deviation, and/or will trigger an automated response by the ECCS. In some cases and in some embodiments, reactor operation personnel may be able to override or cancel an automated ECCS response. In some cases and in some embodiments, the ECCS response to an abnormal operation signal or a combination of such signals may be initiated manually by reactor operation personnel.

To enable automatic alarm triggering and/or automated ECCS response, ECCS control circuitry 54 is provided. In FIG. 1 the ECCS control circuitry 54 is diagrammatically indicated; however, it is to be understood that the ECCS control circuitry 54 includes suitable electronics, analog and/or digital circuitry, digital processor or digital control integrated circuit (IC) chips, or so forth along with suitable sensor devices in order to detect abnormal conditions, generate corresponding abnormal operation signals, activate visual and/or auditory alarms, and perform ECCS operations such as opening valves, closing valves, or so forth in order to implement suitable emergency core cooling operations in response to a detected abnormal condition. Some sensors that may be employed include: a pressure sensor for detecting an abnormally high reactor pressure and generating the high reactor pressure signal; a water level sensor for detecting a low level of primary coolant water in the pressure vessel 12 and generating the low reactor water level signal; an in-core temperature sensor for detecting an abnormally high temperature of the nuclear reactor core 14, or so forth.

Optionally, the ECCS control circuitry 54 may include processing capability in the form of a computer, microcontroller, or other digital processing device that is programmed or otherwise configured to process received abnormal operation signals and to generate suitable alarms and or cause the ECCS to perform a suitable automated response. In some embodiments, the ECCS control circuitry 54 is capable of making certain inferences in deciding a suitable response—for example, a combination of a low reactor water level signal and a high reactor pressure signal may be inferred to indicate a LOCA, whereas a low reactor pressure signal occurring without a concomitant low reactor water level signal may be inferred to indicate a loss of heat sink event. In embodiments in which an automated ECCS response is provided, the ECCS control circuitry 54 suitably includes actuation lines for causing selected valves to open or close. The actuation lines are typically wires or other electrical conductors, but other types of actuation such as pneumatic lines are also contemplated.

Some types of abnormal events that are to be remediated by the ECCS entail an increase in pressure in the PWR 10. For example, a loss of heat sink event (for example, caused by a loss of feedwater flow into the feedwater inlet 22 of the steam generator 18) will produce heating that in turn increases pressure inside the PWR 10. A LOCA will similarly typically lead to heating and pressure increase. An uncontrolled or excessive pressure increase in the PWR 10 is problematic since it can compromise the sealing integrity of the pressure vessel 12 and can lead to escape of primary coolant water in the form of high pressure steam.

To control a pressure increase in the PWR 10, at least one condenser is provided inside the containment structure 40. In the illustrative embodiment, two condensers 60, 62 are provided for redundancy in order to facilitate failsafe ECCS operation. More generally, one, two, three, four, or more condensers are suitably provided. The condensers 60, 62 are designed to operate at high pressure.

As shown in FIG. 1, in embodiments disclosed herein the condensers 60, 62 are mounted on the pressure vessel 12 proximate to the internal pressurizer volume 30. It is recognized herein that this arrangement has certain advantages over an arrangement in which the condensers are located further away from the pressure vessel and connected with the pressure vessel via a steam pipe. For example, the condensers 60, 62 have respective high pressure fluid connections 64, 66 with the internal pressurizer volume 30, and more particularly with the steam bubble in the internal pressurizer volume 30. These high pressure steam connections 64, 66 are shortened in length as compared with an arrangement in which the condensers are located further away from the pressure vessel, which reduces the likelihood of a rupture in these connections 64, 66 leading to a LOCA. Moreover, the shortened length of the fluid connections 64, 66 reduces their fluid resistance thus enabling them to be made of smaller diameter as compared with a longer steam pipe leading to a condenser located away from the pressure vessel. A consequence of the smaller diameter of the high pressure steam connections 64, 66 is that if a rupture does occur the resulting LOCA may be less severe.

To provide failsafe operation, the condensers 60, 62 are suitably passive heat exchangers that reject heat from the steam admitted at the respective condenser inlets 64, 66 to an external heat sink 70 located outside of the containment structure 40. Each condenser 60, 62 is suitably of a "once-through" design having tube bundles surrounded by a shell (details not shown). In one suitable embodiment, steam from the internal pressurizer volume 30 of the PWR 10 flows on the tube-side and water from the external heat sink 70 flows on the shell-side; however, the reverse configuration is also contemplated in which the steam flows on the shell-side and water from the external heat sink 70 flows tube-side.

In the following, the condenser 60 is particularly referred to as an illustrative example. Liquid water from the external heat sink 70 flows via a first pipe 72 into the condenser 60, where heat from the steam transfers to the cooler water from the external heat sink 70 causing the latter to boil or vaporize. The resulting water from the external heat sink 70 (now in a steam phase or mixed steam/water phase) flows via a second pipe 74 back to the external heat sink 70. The flow of water/steam from the external heat sink 70 in the pipes 72, 74 is driven by gravity and density difference between the inflowing water and the outflowing steam or mixed steam/water. In the illustrative embodiment, the pipes 72, 74 have open ends at the external heat sink side that are in fluid communication with water in the external heat sink 70 so that water from the external heat sink 70 flows into the first pipe 72 and the water/steam mixture discharges out of the second pipe 74 into the external heat sink 70. However, in an alternative embodiment, the open ends of the pipes 72, 74 are replaced by a heat exchanger coupling disposed in the external heat sink 70 (not shown) forming closed recirculation path in which the steam/water mixture from the second pipe 74 condenses back into water (rejecting the heat into the external heat sink 70 as before) and the recondensed water flows back into the first pipe 72. Operation of the condenser 62 is the same in order to provide redundancy, but is not illustrated in FIG. 1. The plural condensers 60, 62 may in general be connected with the same external heat sink, or may be connected with different external heat sinks to provide further redundancy.

The external heat sink 70 is suitably a body of water disposed outside the containment structure 40, such as a natural or artificial pond, lake, pool, or the like. Such an external heat sink 70 is also sometimes referred to as an "ultimate" heat sink. In some embodiments, the external heat sink 70 is located in a reactor services building or other structure or enclosure. The water volume of the external heat sink 70 should be sufficient to provide an extended period of operation of the high pressure condenser 60. For example, in some contemplated embodiments the external heat sink 70 is designed to have water volume sufficient for 72 hours continuous operation of the condenser 60.

Each condenser 60, 62 includes a respective condenser outlet 76, 78 to allow condensed water to flow back into the pressure vessel 12. The illustrative condenser outlets 76, 78 connect back into the pressure vessel 12 at an upper plenum 79 of the pressure vessel 12 located below the baffle plate 36 and above the top of the steam generator 18. Alternatively, the condenser outlets can connect with the pressure vessel 12 at a lower point. By way of illustrative example, an alternative condenser outlet 76' for the condenser 60 connects with a reactor coolant inventory makeup line 80 that feeds into a vessel penetration 82 of the pressure vessel 12. Although not illustrated, the condenser outlets 76, 76', 78 optionally include a gas trap to trap gaseous nitrogen ($N_2$) or gaseous oxygen ($O_2$) that exits the condenser 60, 62 at the condenser outlet, in order to prevent these gases from entering into the pressure vessel 12.

The condensers 60, 62 may be used in responding to various types of abnormal events, such as LOCA or loss of heat sinking events. In a suitable approach the ECCS control circuitry 54 opens valves (not shown) to initiate operation of the condensers 60, 62 responsive to a low reactor water level signal, a high reactor pressure signal, or the combination of both a low reactor water level signal and a high reactor pressure signal. Various valve configurations are contemplated. For example, in one approach the steam connections 64, 66 are normally open (that is, open during operation of the PWR, with any isolation valve provided for maintenance being open), while a valve at the outlet 76, 76', 78 (to provide an illustrative example, a valve V1 shown in the alternative condenser outlet 76' of the condenser 60) is normally closed. To initiate operation of the condensers 60, 62, the condenser outlet valves are opened (e.g., in the alternative embodiment employing the condenser outlet 76', the valve V1 is opened to initiate operation of the condenser 60). Alternatively, it is contemplated to have the steam connections 64, 66 normally closed and to open valves (not shown) in the steam connections 64, 66 to initiate operation of the condensers 60, 62.

In the case of a LOCA response, it is advantageous to reduce pressure in the pressure vessel 12 as quickly as feasible in order to allow for injection of makeup water as soon as practicable. Toward this end, once the pressure in the pressure vessel 12 decreases to below a preselected pressure threshold (e.g., a pressure threshold of 200 psia, although other pressure thresholds are also contemplated), a low pressure vent valve V2 opens to connect a vent line 86 from the condenser outlets 76, 76', 78 with a sparger 90 discharging into the RWST 50. In some embodiments, the vent line 86 is arranged in parallel with the condensate return path so that the condensers 60, 62 continue to operate while the sparger 90 accelerates depressurization. Once the pressure in the valve assembly lines is sufficiently depressurized by action of the sparger 90, a valve V3 opens to allow water to flow from the RWST 50 into the reactor coolant inventory makeup line 80 and vessel penetration 82 in order to provide makeup water to compensate for primary coolant water lost in the LOCA. Flow of water from the RWST 50 to the pressure vessel 12 via the valve V5, reactor coolant inventory makeup line 80, and vessel penetration 82 starts when the reactor pressure is less than the sum of the pressure in the containment structure 40 and the gravity head provided by the water level in the RWST 50. Toward this end, the RWST 50 is preferably located at an elevated position in the containment structure 40. Optionally, an external water inlet 88 is provided to deliver additional water to the reactor coolant inventory makeup line 80 through a valve V4 in the event that the water supply in the RWST 50 is exhausted.

Optionally, the ECCS may include other remedial mechanisms besides the condensers 60, 62 and primary coolant water makeup as provided by the RWST 50. For example, in a SCRAM failure entailing a malfunction of the control rods system 16, also sometimes also referred to as an anticipated transient without SCRAM (ATWS), it is desired to shut down the reactor as quickly as possible without the use of the control rods system 16. Toward this end, a quench tank 901 contains a solution of soluble neutron poison for delivering a high concentration of soluble neutron poison into the primary coolant water in the pressure vessel 12 to quench core reactivity. In the illustrative embodiment, the quench tank 901 is an emergency boron tank 901 containing a concentrated solution of sodium pentaborate or another soluble boron compound; however, the quench tank may in general contain a solution of another species of soluble poison. The boron tank 901 is connected with a steam line 92 via a valve V5 to provide pressurization of the emergency boron tank 901 in the event of a SCRAM failure. The steam line 92 is taken off of the steam connection 64 of the condenser 60 (as illustrated in FIG. 1; however, the steam line 92 may optionally also connect with the steam connection 66 of the condenser 62, or to provide further redundancy a separate emergency boron tank may be pressurized by each respective condenser steam connection 64, 66). The emergency boron tank 901 is also connected with the reactor coolant inventory makeup line 80 that feeds into a vessel penetration 82 of the pressure vessel 12 via a valve V6.

The valves V5, V6 are normally closed (that is, are closed during normal operation of the PWR 10). When the ECCS control circuitry 54 detects a SCRAM failure, the valves V5, V6 are opened manually or by an automatic control signal from the ECCS control circuitry 54. Opening the valve V5 places the steam bubble in the internal pressurizer volume 30 into fluid communication with the emergency boron tank 901 to pressurize the emergency boron tank 901, which is suitably located above the RWST 50. The relative pressure head between the pressurized boron tank 901 and the primary coolant water in the pressure vessel 12 allows the boron solution to flow into the pressure vessel 12 through the opened valve V6, reactor coolant inventory makeup line 80 and the vessel penetration 82.

The ECCS shown in FIG. 1 is an illustrative example. It is to be understood that various levels of redundancy may be incorporated into the ECCS to facilitate failsafe operation. For example, one or more of the various valves V1, V2, V3, V4, V5 may incorporate various combinations of redundant parallel paths, may include check valves, may include manually operated isolation valves for use during maintenance operations or the like, or so forth. Duplication of the emergency boron tank 901 and/or further duplication of the condensers 60, 62 (e.g., providing three or more condensers), or redundancy of other components may be provided. Moreover, it is to be understood that various combinations of disclosed components or aspects may be employed in various embodiments. For example, in some embodiments the emergency boron tank 901 may be omitted in favor of another auxiliary reactivity control mechanism, or an emergency boron tank pressurized by a dedicated gas nitrogen source may be provided in place of the illustrative arrangement.

Having with reference to FIG. 1 provided an overview of an illustrative ECCS system employing condensers 60, 62 secured with an upper portion of the pressure vessel 12, some further aspects of this arrangement are next described.

Figure 2:
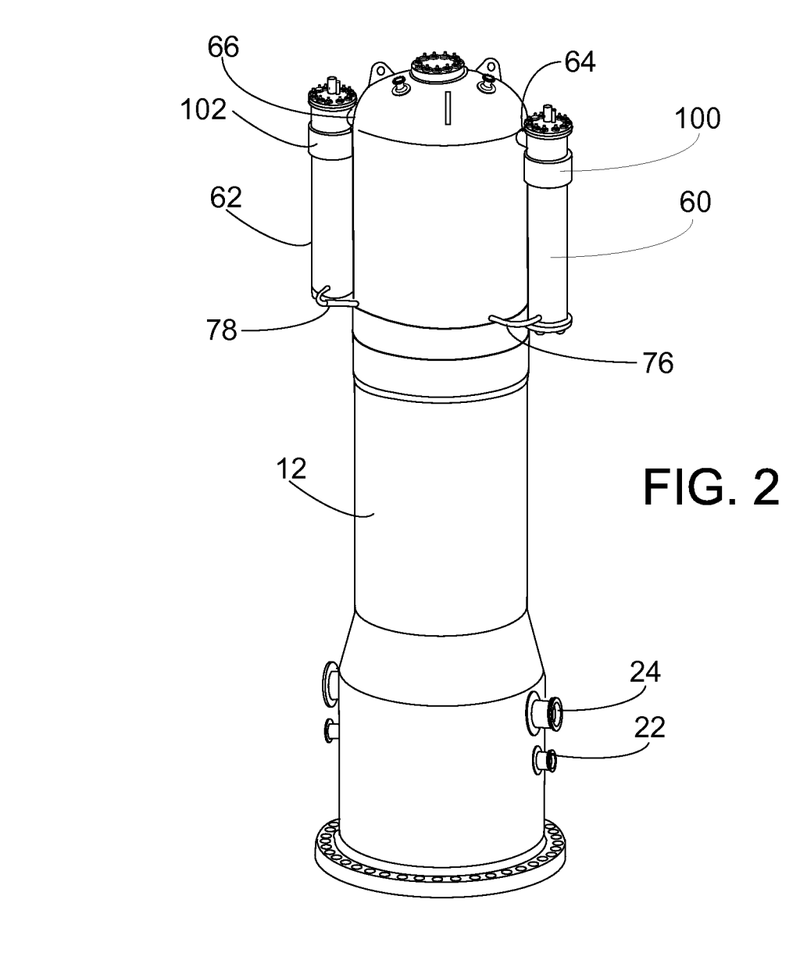
FIG. 2 diagrammatically shows a perspective view of an upper portion of the pressure vessel of the PWR of FIG. 1 including associated high pressure condensers.

With reference to FIG. 2, an enlarged view of an upper portion of the pressure vessel 12 is shown. FIG. 2 demonstrates that the detailed shape of the upper portion of the pressure vessel 12 can vary amongst different embodiments—for example, the upper portion of the pressure vessel 12 shown in FIG. 2 differs from that shown in FIG. 1 by including a narrowing outer diameter as compared with the lower portion of the pressure vessel 12 in the example of FIG. 2. The condensers 60, 62 shown in FIG. 2 also include respective optional mounting brackets 100, 102 for securing, or contributing to securing, the condensers 60, 62 to the pressure vessel 12. Additionally or alternatively, the high pressure fluid connections 64, 66 of the respective condensers 60, 62 suitably secure, or contribute to securing, the condensers 60, 62 to the pressure vessel 12. The condensers 60, 62 are supported at an elevated position respective to the nuclear reactor core 12 by the pressure vessel 12 via the high pressure fluid connections 64, 66, or the optional mounting brackets 100, 102, or by a combination of these elements. The securing of the condensers 60, 62 should be sufficient that any force reasonably anticipated to act on the securing connection will not cause the condenser to move so as to create a double-ended break.

Figure 3:
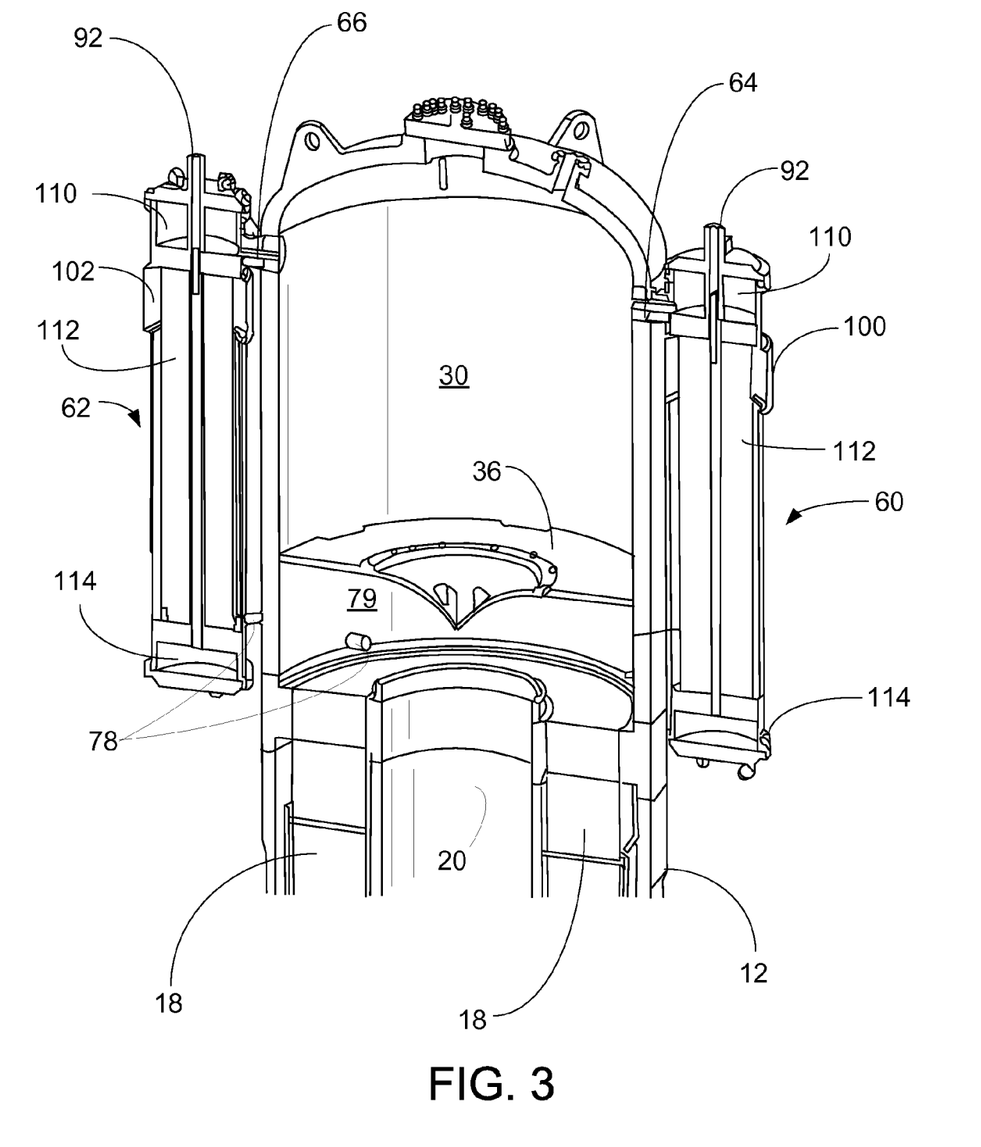
FIG. 3 shown an enlarged and sectional perspective view of the upper portion of the pressure vessel of the PWR of FIG. 1 including associated high pressure condensers.

With reference to FIG. 3, the emergency condensers 60, 62 are in fluid communication with the internal pressurizer volume 30 by steam connections 64, 66 that are designed to operate with a low pressure drop during normal operation and include a reduced area section at the inlet connection from the pressurizer (e.g., an internal orifice) that limits flow in the event of a pipe break. If multiple condensers are used (e.g., the illustrated two condensers 60, 62), and if the steam line between the pressure vessel 12 and one of the condensers is broken, then flow through the internal orifice will be the dominant cause of pressure drop and the flow lost through the break will be proportional to the ratio of the pipes broken versus the number of condensers. In some embodiments a pressure drop across the steam line is less than one-third of a pressure drop across orifices of the steam line.

The steam connections 64, 66 convey steam from the steam bubble in the internal pressurizer volume 30 into an upper plenum region 110 of the condenser. The steam flows inside the tubes of a tube bundle 112, while water from the heat sink 70 (see FIG. 1) flows into the condenser from the first pipe 72 and flows on the shell side, that is, around the outsides of the tubes of the tube bundle 112. (In an alternative embodiment, the steam from the internal pressurizer volume 30 may flow on the shell-side while water from the heat sink 70 flows through the tubes of the tube bundle 112.) The tubes of the tube bundle 112 can have substantially any configuration, such as straight vertical tubes surrounded by a common shell (forming a once-through straight tube heat exchanger), or horizontal tubes, U-tubes, or coaxial tube heat exchangers (in which the tubes have individual shells). Heat from the steam is rejected to the proximate water from the heat sink to produce heated water, steam, or a mixture of heated water or steam that is returned to the heat sink 70 via the second pipe 74. The condensate formed by condensing the steam from the internal pressurizer volume then flows downward into a lower plenum 114 and drains into the pressure vessel 12 though the condenser outlets 76, 78 (only the condenser outlet 78 of the condenser 62 is visible in the perspective sectional view of FIG. 3). The condensate can be returned to the upper flow plenum 79 above the upper tubesheet of the steam generator 18 as shown in FIG. 3, or can be piped to discharge below the lower tubesheet (e.g., using the alternative condenser outlet 76' shown in FIG. 1). Each condenser 60, 62 also has a steam line 92 in fluid communication with the lower plenum 114 that can be used to pressurize one or more sodium pentaborate tanks (e.g., emergency boron tank 901 shown in FIG. 1) and provide emergency depressurization through the vent line 86 and sparger 90 during the final phases of a LOCA blowdown.

In a contemplated variation (not illustrated), an optional emergency boron supply is integrated with the condensers. In this approach, the lower plenum 114 is modified to include a reservoir for a boron-containing solution. This reservoir can be pressurized by the condensate line leaving the condenser, causing the boron to flow into the reactor to achieve emergency shutdown. In such embodiments the separate emergency boron tank 901 may optionally be omitted.

The illustrative condensers 60, 62 are connected to the pressure vessel 12 without isolation valves. Upon condenser startup, a gradual introduction of water from the heat sink 70 (that is, secondary water) is performed to prevent excessive stresses inside the condenser. Alternatively, isolation valves (not shown) can be incorporated on the condenser outlet lines 76, 78 to allow the primary side of the condenser to fill with water during normal operation. If the condensers are insulated from the side of the pressurizer, the secondary side can be left open to the ultimate heat sink tanks with minimal heat loss. Condenser startup in this case would entail opening one or both of the primary isolation valves.

Figure 4:
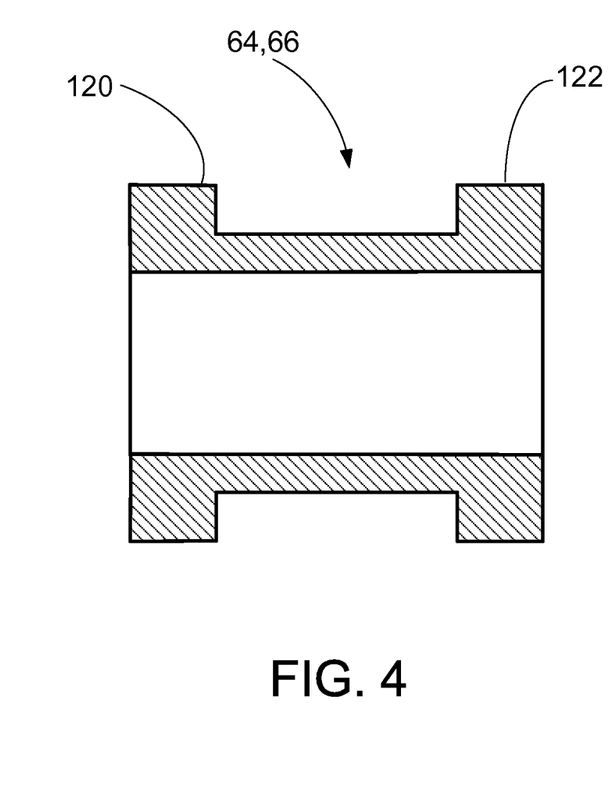
FIG. 4 shows a cross-sectional view of an embodiment of a steam line comprising a single metal forging for connecting the internal pressurizer volume with a condenser inlet of one of the condensers of FIG. 1

With reference to FIG. 4, in some embodiments each steam connection 64, 66 is embodied as a single metal forging having a first end 120 welded to the pressure vessel 12 and a second end 122 welded to the condenser (and more particularly to the condenser inlet). In some embodiments, the single metal forging is suitably a single steel or steel alloy forging. In an alternative embodiment (not illustrated), each steam line is a double wall pipe. The steam connections 64, 66 are designed to exceed the maximum design pressure of the primary coolant system.

The disclosed configuration in which the condensers 60, 62 are closely integrated with (e.g., secured with and optionally supported by) the pressure vessel 12 has numerous advantages over approaches in which the condensers are separate from the pressure vessel and connected by relatively longer steam lines. By close coupling multiple condensers 60, 62 to the upper portion of the reactor pressure vessel 12, the likelihood of accident scenarios involving breakage of the pressure vessel/condenser steam linkage is substantially reduced. This in turn reduces the frequency of early core damage as calculated in the probabilistic risk assessment. The disclosed integrated approach substantially reduces the likelihood of a double-ended break of the steam line. Such a double-ended break is further reduced when the optional brackets 100, 102 are employed to prevent shifting of the condensers 60, 62; however, even with such brackets omitted the use of a single steel or steel alloy forging for the steam connections 64, 66 substantially reduces likelihood of a double-ended break.

Another advantage of the integrated configuration is that it can allow condensate from the condensers 60, 62 to be discharged upstream of the primary coolant pumps (in embodiments employing assisted or forced primary coolant circulation). This is because the condenser inlets 76, 78 inject the condensate at a high point, e.g. into the upper plenum 79. If the primary coolant pumps are located lower in the pressure vessel 12, then the pumps can optionally continue to operate during operation of the condensers 60, 62.

Yet another advantage of the disclosed integrated approach is realized during refueling or other maintenance. At each refueling outage, the upper portion of the pressure vessel 12 is typically removed, together with the steam generator 18, and moved to a steam generator inspection station (not shown). The tubes in the emergency condensers 60, 62 are suitably inspected at the same time. The securing of the condensers 60, 62 with the upper portion of the pressure vessel 12 allows both condensers 60, 62 to be moved with the steam generator 18 to a compartment equipped to perform tube inspection.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
   a pressurized water reactor (PWR) disposed within a containment structure, the PWR including a pressure vessel having a lower portion containing a nuclear reactor core comprising a fissile material and an upper portion defining an internal pressurizer volume;
   a baffle plate disposed in the pressure vessel between the lower portion and the upper portion so that the baffle plate separates the internal pressurizer volume from the lower portion;
   at least one steam pressure control device provided in the internal pressurizer volume;
   a condenser including a condenser inlet and a condenser outlet, the condenser being supported only by the upper portion of the pressure vessel; and
   a steam line connecting the internal pressurizer volume with the condenser inlet of the condenser, wherein the condenser outlet is in fluid communication with a sealed volume contained by the pressure vessel at a point below the steam line, and wherein the condenser is a passive heat exchanger that condenses steam flowing into the condenser from the internal pressurizer volume while rejecting heat to a heat sink comprising a body of water that is disposed external to the containment structure, the condensed steam flowing into the sealed volume contained by the pressure vessel via the condenser outlet.

2. The apparatus of claim 1, wherein the condenser is supported by the upper portion of the pressure vessel via the steam line connecting the internal pressurizer volume with the condenser inlet of the condenser.

3. The apparatus of claim 1, further comprising:
a steam generator disposed inside the pressure vessel;
wherein the condenser outlet is in fluid communication with the sealed volume contained by the pressure vessel at an upper plenum between the internal pressurizer volume and the steam generator.

4. The apparatus of claim 1, wherein the steam line comprises a single metal forging having a first end welded to the pressure vessel and a second end welded to the condenser.

5. The apparatus of claim 1, wherein a pressure drop across the steam line is less than one-third of a pressure drop across orifices of the steam line.

6. An apparatus comprising:
a pressurized water reactor (PWR) disposed within a containment structure, the PWR including a pressure vessel having a lower portion containing a nuclear reactor core comprising a fissile material and an upper portion defining an internal pressurizer volume;
a baffle plate disposed in the pressure vessel between the lower portion and the upper portion so that the baffle plate separates the internal pressurizer volume from the lower portion;
at least one steam pressure control device provided in the internal pressurizer volume;
a condenser secured to the upper portion of the pressure vessel and having a condenser inlet in fluid communication with the internal pressurizer volume;
a heat sink in fluid communication with the condenser, the condenser operating as a passive heat exchanger to condense steam from the internal pressurizer volume into condensate while rejecting heat to the heat sink, the heat sink being located external to the containment structure; and
a condenser outlet connected with the pressure vessel to flow the condensate back into the pressure vessel.

7. The apparatus of claim 6, wherein the condenser is supported at an elevated position respective to the nuclear reactor core by the pressure vessel.

8. The apparatus of claim 6, further comprising:
a single metal forging providing fluid communication between the condenser inlet and the internal pressurizer volume, the single metal forging having a first end welded to the pressure vessel and a second end welded to the condenser inlet.

9. The apparatus of claim 8, wherein the single metal forging is a single steel or steel alloy forging.

10. The apparatus of claim 6, further comprising:
a steam generator disposed inside the pressure vessel;
wherein the condenser outlet connects with the pressure vessel above an upper end of the steam generator.

11. The apparatus of claim 6, further comprising: said heat sink comprising a body of water in fluid communication with the condenser.

12. The apparatus of claim 6, wherein:
the condenser comprises a tube bundle with a surrounding shell;
the heat sink is in fluid communication with one of the tube-side and the shell-side of the tube bundle; and
the condenser inlet is in fluid communication with the other of the tube-side and the shell-side of the tube bundle.

* * * * *